United States Patent [19]

Arakawa

[11] Patent Number: 4,926,711

[45] Date of Patent: May 22, 1990

[54] WORM GEAR TYPE DIFFERENTIAL MECHANISM

[75] Inventor: Yoshichika Arakawa, Nagoya, Japan

[73] Assignee: Aisin Seiki Kabushiki Kaisha, Kariya, Japan

[21] Appl. No.: 273,609

[22] Filed: Nov. 21, 1988

[30] Foreign Application Priority Data

Nov. 21, 1987 [JP] Japan ................................ 62-293099

[51] Int. Cl.⁵ .............................................. F16H 1/44
[52] U.S. Cl. .................................................... 475/227
[58] Field of Search ........................ 74/710.5, 711, 715

[56] References Cited

U.S. PATENT DOCUMENTS

| 2,070,569 | 2/1937 | Asam | 74/715 |
| 2,559,916 | 7/1951 | Gleasman | 74/715 |
| 2,859,641 | 11/1958 | Gleasman | 74/715 |
| 3,237,483 | 3/1966 | Kelley et al. | 74/715 |
| 4,191,071 | 3/1980 | Gleasman et al. | 74/715 |
| 4,512,211 | 4/1985 | Stritzel | 74/715 |
| 4,724,721 | 2/1988 | Gleasman et al. | 74/715 |
| 4,762,024 | 8/1988 | Graft | 74/715 |
| 4,805,487 | 2/1989 | Pedersen | 74/715 |

FOREIGN PATENT DOCUMENTS 1149003 12/1957 France ................................ 74/715

*Primary Examiner*—Dwight G. Diehl
*Attorney, Agent, or Firm*—Burns, Doane, Swecker & Mathis

[57] ABSTRACT

A worm gear type differential mechanism has a bias ratio equalization mechanism disposed between the casing and the worm gears. The bias ratio equalization mechanism includes frictional members disposed between axially opposite transverse faces of the casing and each of the worm gears, and each of the frictional materials has frictional faces which create the same friction force per unit of thrust force applied thereagainst. The frictional materials fix the worm gear axially to the casing.

5 Claims, 3 Drawing Sheets

WORM GEAR TYPE DIFFERENTIAL MECHANISM

BACKGROUND OF THE INVENTION

1. Field of the Invention

This invention concerns a differential mechanism for an automobile, especially a worm gear type differential mechanism with a bias ratio equalization mechanism.

2. Description of the Related Art

A conventional worm gear type differential mechanism is shown in U.S. Pat. No. 4,491,035 and in FIG. 3 of the attached drawing.

As can be seen in FIG. 3, two worm gears (driving gears) 122, 124 are engaged to axle shafts 118, 120 through splines. A thrust element 164 is supported between opposite faces of the gears, the gears being coaxially aligned in a casing 112. The teeth of the worm gears extend in the same direction. When the resistance of the left wheel is the same as the resistance of the right wheel, the rotation transmitted to the casing 112 through a ring gear 117 is transmitted to the axle shafts through worm wheels 136 and the worm gears 122, 124, and the car goes straight. The worm wheels 136 are rotationally mounted on shafts 127 which are attached to the casing 112. In that example, the casing rotates with the worm gears and the worm wheels.

When one of the wheels slips on a muddy or snowy road, creating a difference in the resistances between the wheels, the differential mechanism is operated to effect a relative movement between the shafts 118, 120 through the action of a frictional torque. In the conventional differential mechanism, the worm gears 122, 124 support the thrust element 164 between their opposite faces, and axially contact each other through that element 164. Therefore the thrust forces acting on each of the worm gears by the transmitting torque influence each other in order that the thrust force of one of the worm gears is transmitted to the other worm gear depending upon the direction of the rotation of the casing.

For example, the thrust force F acting on the worm gear 124 (which is operable engaged with the casing 112 through the spacer 180) is a total of the thrust force F1 resulting from engagement between the worm gear 124 and the worm wheel 136 and the thrust force F2 resulting from engagement between the worm gear 122 and the worm wheel 136 (i.e., F=F1+F2). The worm gear 124 is influenced by contact with the worm gear 122 such that F2 is added to the thrust force of the worm gear 124. Therefore the frictional torque of one of the wheels is different from the frictional torque of the other wheel. The frictional torque is added to or subtracted from the driving torque of the wheels in accordance with which of the wheels encounters more resistance. Thus, the value of the frictional torque of one of the wheels is different from the value of the frictional torque of other of the wheels; therefore, when two wheels slip, the torque bias ratio of the one of the wheels is different from the torque bias ratio of the other of the wheels. When the car turns to right or left thereby, the characteristics of the steering are different, and this adversely affects overall driving stability.

In order to solve the above mentioned problem, it has been suggested that the teeth of the worm gears be twisted in mutually opposite directions, so that the thrust forces influence the worm gears in opposite directions, whereby mutual influence of the thrust forces is eliminated. A prior art U.S. Pat. No. 4,491,036 shows this technique and is depicted in FIG. 4 herein. An idler gear (i.e., the central transfer gear) 234 is disposed between the transfer gears 230, 232. The transfer gear 230 engages the transfer gear 232 through the idler gear 234. However, since the mechanism needs idler gears, the mechanism has a shortcoming in that the length of the casing is longer. Further, since the teeth of the worm gears are twisted oppositely, two types of worm gears must be manufactured. Furthermore, since the mechanism needs idler gears (usually three), shafts supporting the idler gears, and the extra hole-drilling operations in the casing, the manufacturing costs are higher.

SUMMARY OF A PREFERRED EMBODIMENT OF THE INVENTION

It is an object of the invention to provide a worm gear type differential mechanism in which the left torque bias ratio is equivalent to the right torque bias ratio.

It is another object of the invention to provide a worm gear type differential mechanism which provides for stable operation of a vehicle in which the differential is utilized.

It is another object of the invention to provide a worm gear type differential mechanism which does not need idler gears, and associated supporting shafts, and hole-drilling operations.

It is another object of the invention to provide a worm gear type differential mechanism which uses identical worm gears.

In order to accomplish the objects, a worm gear type differential mechanism is comprised with a bias ratio equalization mechanism disposed between the casing and the worm gears. The bias ratio equalization mechanism includes frictional members disposed between axially opposing transverse faces of the casing and each of the worm gears. Each of the frictional members has frictional faces which generate the same friction force per unit of thrust applied thereagainst. The friction members axially fix the worm gear to the casing.

DETAILED DESCRIPTION OF A PREFERRED EMBODIMENT OF THE INVENTION

Figure 1:
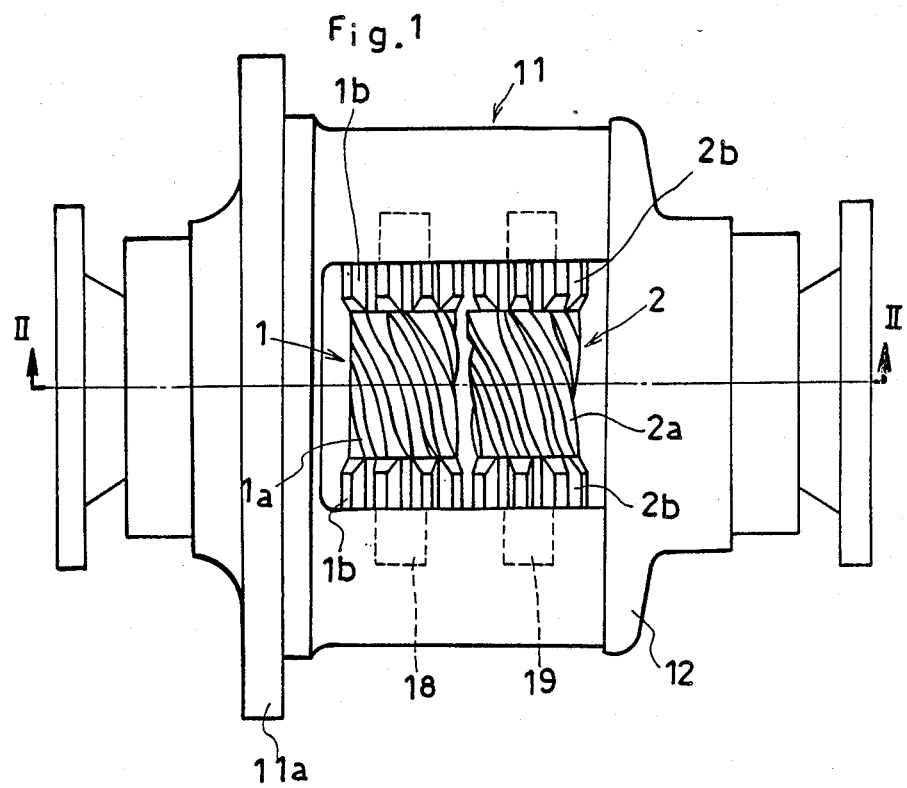
FIG. 1 is a front view of a worm gear type differential mechanism according to the invention.
Figure 2:
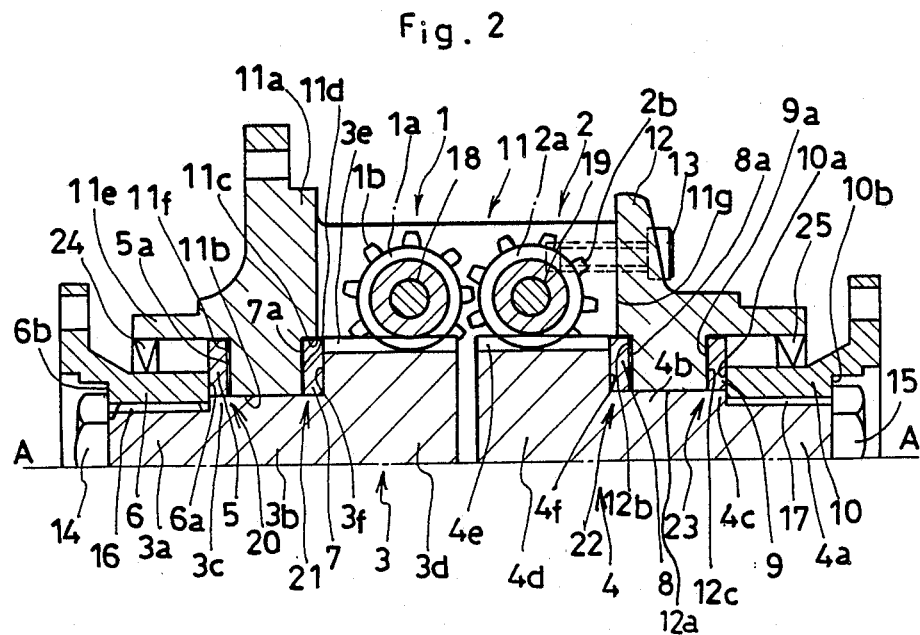
FIG. 2 is a longitudinal sectional view taken along line II—II in FIG. 1.
Figure 3:
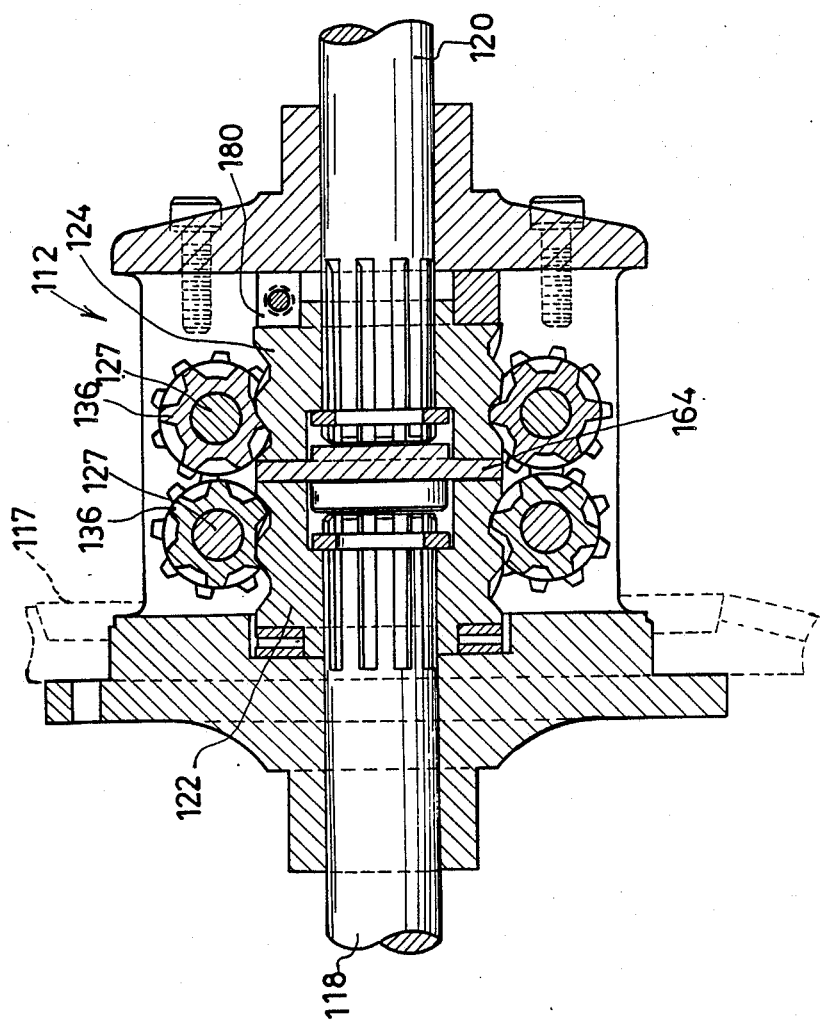
FIG. 3 is a longitudinal sectional view of a prior art type of differential mechanism.
Figure 4:
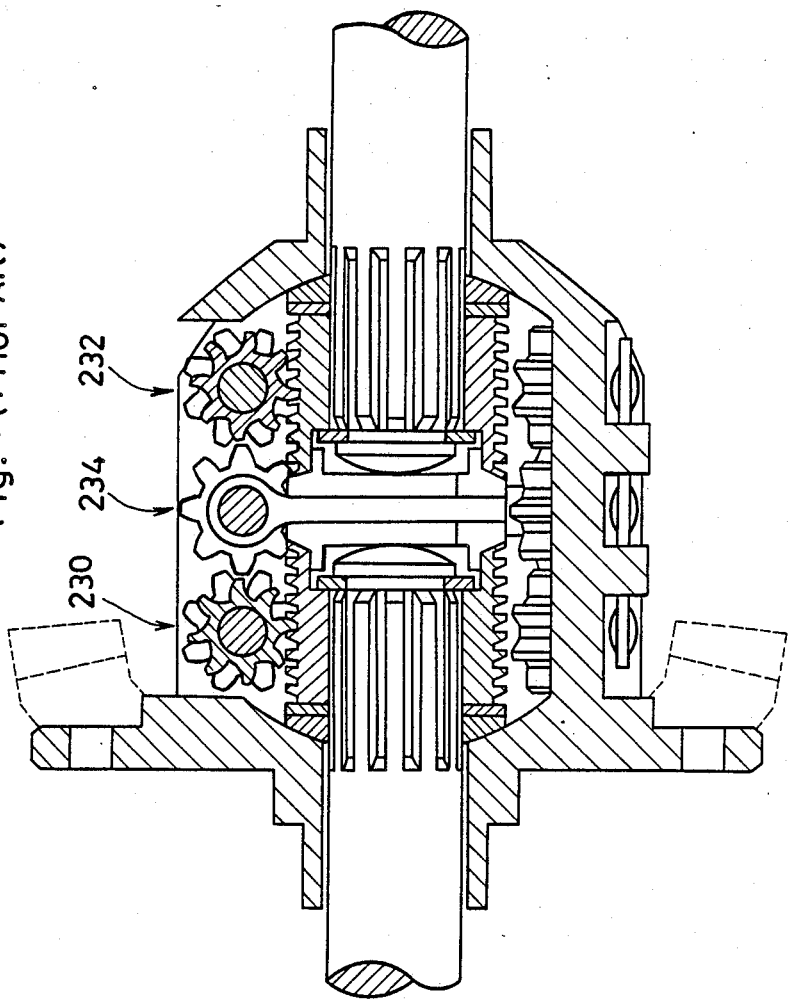
FIG. 4 is a longitudinal sectional view of another prior art type of differential mechanism.

In FIGS. 1 and 2, worm gears 3, 4 are coaxially aligned on an axis A—A. Output flanges 6, 10 engage reduced diameter parts 3a, 4a of the worm gears 3, 4 by means of splines 16, 17. The output flange 6 is thus rotatably fixed to the worm gear 3 through the splines 16 for rotation therewith in a direction of rotation. An inner end face 6a of the output flange 6 contacts a radial step 3c interconnecting the reduced diameter part 3a and a middle diameter part 3b of the worm gear 3. Another outer end face 6b contacts a bolt 14 joined to an end face of the worm gear 4, so that the output flange 6 is axially fixed to the worm gear 3. In like construction, the output flange 10 is rotatably fixed to the worm gear 4 through the splines 17 for rotation in a direction of rotation. An inner end face 10a of the output flange 10 contacts a step 4c and another outer face 10b contacts a bolt 15, so that the output flange 10 is axially fixed to the worm gear 4. The output flanges 6, 10 are connected respectively to left and right axle shafts (not shown).

Large diameter parts 3d, 4d of the worm gears have teeth 3e, 4e extending in a common direction. Teeth 3e formed on the outside of the large diameter part 3d engage teeth 1a of the worm wheel 1. In like construction, teeth 4e of the large diameter part 4d engage teeth 2a of the worm wheel 2. The axes of worm wheels 1, 2 are disposed orthogonally to the axis A—A and parallel to each other. The worm wheels 1, 2 are connected to a rotating part (i.e., differential casing 11) so that they can rotate around the axis A. The worm wheel 1 is rotatably supported to a center shaft 18 fixed to the casing 11. In like construction, the worm wheel 2 is rotatably supported to a center shaft 19 fixed to the casing 11. Spur gears 1b, 2b are formed on both sides of each of the worm wheels 1, 2. The spur gears 1b, 2b engage each other, whereby the rotation of one of the worm wheels is transferred to the other of the worm wheels in synchronized condition. In the casing 11, another pair of worm wheels is provided (not shown in Figs.). The worm gears 3, 4 extend through both walls of the casing 11, namely through a wall 11a and a cover 12 fixed by bolts 13 to an end face 11g of the casing 11, and are rotatably supported in the walls at spaced locations from each other. A hole 11b is bored axially through the wall 11a of the casing. In that hole the middle diameter part 3b is fitted. The worm gear 3 is rotatably supported in the wall 11a through the hole 11b. In like construction, the middle diameter part 4b of the worm gear 4 fits in a hole 12a of the cover 12a, and the worm gear 4 is rotatably supported in the cover 12 through the hole 12a.

A circular groove 11c is axially formed on an inner wall face of the wall 11a. An arrangement 21 of opposing faces is defined by a bottom face 11d of the groove 11c and a side face 3f of the large diameter part 3d. Further, an arrangement 20 of opposing faces is defined by an end face 6a of the output flange 6 and a bottom face 11f of a hole formed axially through a hub 11e of the wall 11a. In like construction, an arrangement 22 of opposing faces is defined by a bottom face 12b of the groove of the cover 12 and a side face 4f of the large diameter part of the worm gear 4. An arrangement 23 of opposing faces is defined by an end face 10a of the output flange 10 and the bottom face 12c of the axial hole. In each of the arrangements of opposing faces 20–23 a thrust material (namely a thrust washer) is disposed in such condition that the sides of the thrust washer contact respective ones of the opposing faces. In particular, a thrust washer 5 is disposed in the arrangement 20, a thrust washer 7 in the arrangement face 21, a thrust washer 8 in the arrangement 22, and a thrust washer 9 in the arrangement 23. The thrust washer 5 is fixed to the output flange 6; the thrust washer 7 is fixed to the worm gear 3; the thrust washer 8 is fixed to the worm gear 4; and the thrust washer 9 is fixed to the output flange 10. Therefore, no frictional sliding contact occurs directly between the opposing faces. As a thrust ring retaining means, a lock key, a lock pin, a flat notch, etc. can be used. Between the casing 12 and each of the thrust washers, respective sliding frictional interfaces 5a, 7a, 8a, 9a are formed. Characteristics of the thrust washers 5, 7, 8, 9, such as diameter and coefficient of friction for example are selected so that the frictional torques generated by the thrust washers are equal. Preferably, the thrust washers are provided with the same diameter and are formed of the same material (i.e., they have the same coefficient of friction). In the event that a thrust washer has a different diameter or material, a change in another characteristic thereof will be made to assure that the thrust washers have the same frictional torque. For example, if the diameter of a thrust washer is ⅔ in comparison with another, the material of the former is selected to have a coefficient of friction which is 3/2 that of the latter. While it is better that the frictional torques of the thrust washers are equal, it is possible to change the frictional torque occurring between the forward and reverse movements of the car. For example, between the frictional faces 5a, 8a for forward movement and the frictional faces 7a, 9a for reverse movement, it is possible to form the frictional faces to create different frictional forces under the same thrust forces.

The thrust washer can comprise a single plate, or multiple plates. Further it is possible to dispose slidable materials between the multiple plates.

The worm gears 3, 4 are axially fixed to the casing through the thrust washers and are spaced from each other. No force transmitting structure such as a thrust washer for example, contact the mutually facing end faces of the worm gears. The worm gear 3 is prevented from moving to the left in FIG. 2 by contact of the thrust washer 7 with the flange 6, and is prevented from moving to the right by contact of the thrust washer 5 with the output flange 6. In like fashion, the worm gear 4 is prevented from moving to the left by contact of the thrust washer 9 with the flange 6, and is prevented from moving to the right by contact of the thrust washer 8 with flange 6. Therefore, the thrust force acting against one of the worm gears does not affect the other. In gaps between the hub of the casing and the output flange, packings 24, 25 are disposed.

In the above mentioned construction, the rotation of the casing by a conventional ring gear (not shown) fixed to the casing is transmitted to the worm gears 3, 4 through the worm wheels 1, 2. The rotation transmitted to the worm gears is transmitted to left and right axle shafts (not shown) fixed to the output flanges 6, 10, and the car goes straight. Thrust is applied to the worm gears as a result of the torque transmitted thereto by the worm wheel. The direction of the thrust force depends upon the direction of rotation of the casing. That is, the thrust force direction is changed when the direction of rotation of the casing is changed. If the teeth of the worm gears 3, 4 are twisted to the left and the casing rotates forwardly, the thrust forces act against the worm gears toward the right. For example, the thrust force forcing the worm gear 3 to the right is transmitted to the output flange 6 and then to the thrust washer 5, and finally to the sliding frictional interface 5a formed between the thrust washer 5 and the casing 11. When the casing rotates in the opposite direction, the thrust forces act to the left, and the worm gear 3 is forced to the left in a manner transmitting thrust to the thrust washer 7 which results in sliding frictional force at the interface 7a. In like fashion, a thrust force forcing the worm gear 4 toward the right results in sliding friction at interface 8a and a thrust force urging worm gear 4 to the left results in sliding friction at interface 3a. The thrust forces acting on the worm gears 3, 4 are mutually independent and do not interfere with each other.

On muddy or snowy roads, when one of the wheels slips and a difference in resistance occurs between the wheels, the differential mechanism operates and relative movements occur between the worm gear and the worm wheel and between the worm gear and the casing. That is, slipping occurs between the worm gears and the worm wheels whereupon there occurs a frictional force operating along the tooth face of the worm gear and acting tangentially against the worm gear. That frictional force acts in compensating fashion between the slipping and non-slipping sides. That is, the driving Torque $P_{g1}$ of the slipping side worm gear is:

$$P_{g1} = F_{t1} - F_{f1}$$

wherein; $F_f$ is the element of the tangential direction of the frictional force, and $F_t$ is the driving torque of the worm gear. The driving torque $P_{g2}$ of the non-slip side worm gear is:

$$P_{g2} = F_{t2} + F_{f2}$$

The frictional torque acting between the worm gears and the casing occurs in proportion to the thrust force. When the left wheel slips, the left worm gear rotates more rapidly than the casing 11, and then the frictional torque acts counter to the driving torque. On the non-slipping right wheel, the right worm gear rotates more slowly than the casing through the differential mechanism, and the frictional torque is added to the driving torque. Thus, the torque applied to the worm gear on the slipping side is:

for slipping of the left wheel:

$$T_1 = P_{g1} - P_{th1}$$

$$T_2 = P_{g2} + P_{th2}$$

for slipping of the right wheel:

$$T_1 = P_{g1} - P_{th1}$$

$$T_2 = P_{g2} + P_{th2}$$

wherein:

$T_1$ is the torque of the slipping side worm gear, $T_2$ is the torque of the non-slipping side worm gear, $P_{th1}$ is the frictional torque occurring between the slipping side worm gear and the casing, and $P_{th2}$ is the frictional torque occurring between the non-slipping side worm gear and the casing.

The ratio of the torque bias R equals $T_2/T_1$. Therefore, R has the same value regardless of whether the right or left wheel slips and regardless of whether the car turns to the right or to the left, whereby stability is maintained. This relationship exists regardless of the direction of rotation of the casing, and regardless of whether the worm gear teeth are twisted (i.e., formed) to the right or to the left. Therefore, the ratio of the torque bias is substantially equivalent in spite of the forwarding or reversing of the car or in spite of the twist direction of the gear tooth.

While this invention has been described fully and completely with special emphasis upon a single preferred embodiment with a few alternate features, it should be understood that within the scope of the appended claims, the invention may be practiced otherwise than as specifically described herein.

It will be appreciated by those skilled in the art that various additions, substitutions, modifications and omissions may be made to the foregoing disclosed preferred embodiment of the invention without departing from the spirit or scope of the invention.

What is claimed is:

1. A worm gear type differential mechanism comprising:

a casing, first and second shafts having axially aligned first and second ends rotationally disposed in said casing, a first worm gear joined for common rotation with said first end of said first shaft, said first end facing said second end of said second shaft, a second worm gear joined for common rotation with said second end of said second shaft, a first worm wheel supported rotationally to said casing orthogonally to said first and second shafts, and engaged with said first worm gear, a second worm wheel supported rotationally to said casing orthogonally to said first and second shafts and extending parallel to said first worm wheel, said second worm wheel engaging said second worm gear, spur gears joined for common rotation with said first and second worm wheels, respectively, and engaged with one another, and bias ratio equalizing means disposed between said casing and said first and second worm gears operating in response to the occurrence of relative rotation between said first and second shafts for equalizing the ratios of torque acting on said worm gears such that the ratio of the torque $T_1$ acting on the worm gear of the faster shaft to the torque $T_2$ acting on the worm gear of the slower shaft is substantially equal regardless of which of said shafts constitutes the faster shaft, said first worm gear includes first and second axially spaced transverse faces, said casing including third and fourth axially spaced transverse faces, said first and third transverse faces being axially opposed to define a first space, said second and fourth transverse faces being axially opposed to define a second space, said second worm gear including fifth and sixth axially spaced transverse faces, said casing including seventh and eighth axially spaced transverse faces, said fifth and seventh transverse faces being axially opposed to define a third space, and said sixth and eighth transverse faces being axially opposed to define a fourth space, said bias ratio equalizing means comprising friction members disposed in said first, second, third and fourth spaces.

2. A worm gear type differential mechanism according to claim 1, wherein said friction members axially retain said worm gears to said casing.

3. A worm gear type differential mechanism according to claim 1, wherein said casing includes axially aligned first and second bores through which said first and second shaft ends extend, said third and fourth transverse faces extending radially from said first bore, and said seventh and eighth transverse faces extending radially from said second bore.

4. A worm gear type differential mechanism according to claim 1, wherein said first and second shaft ends include first and second end surfaces spaced axially apart with no force transmitting structure disposed therebetween.

5. A worm gear type differential mechanism according to claim 1, wherein said friction members generate equal frictional force per unit of axial thrust imposed thereon in response to relative axial movement between said worm gears and said casing.

* * * * *